Patented Feb. 9, 1926.

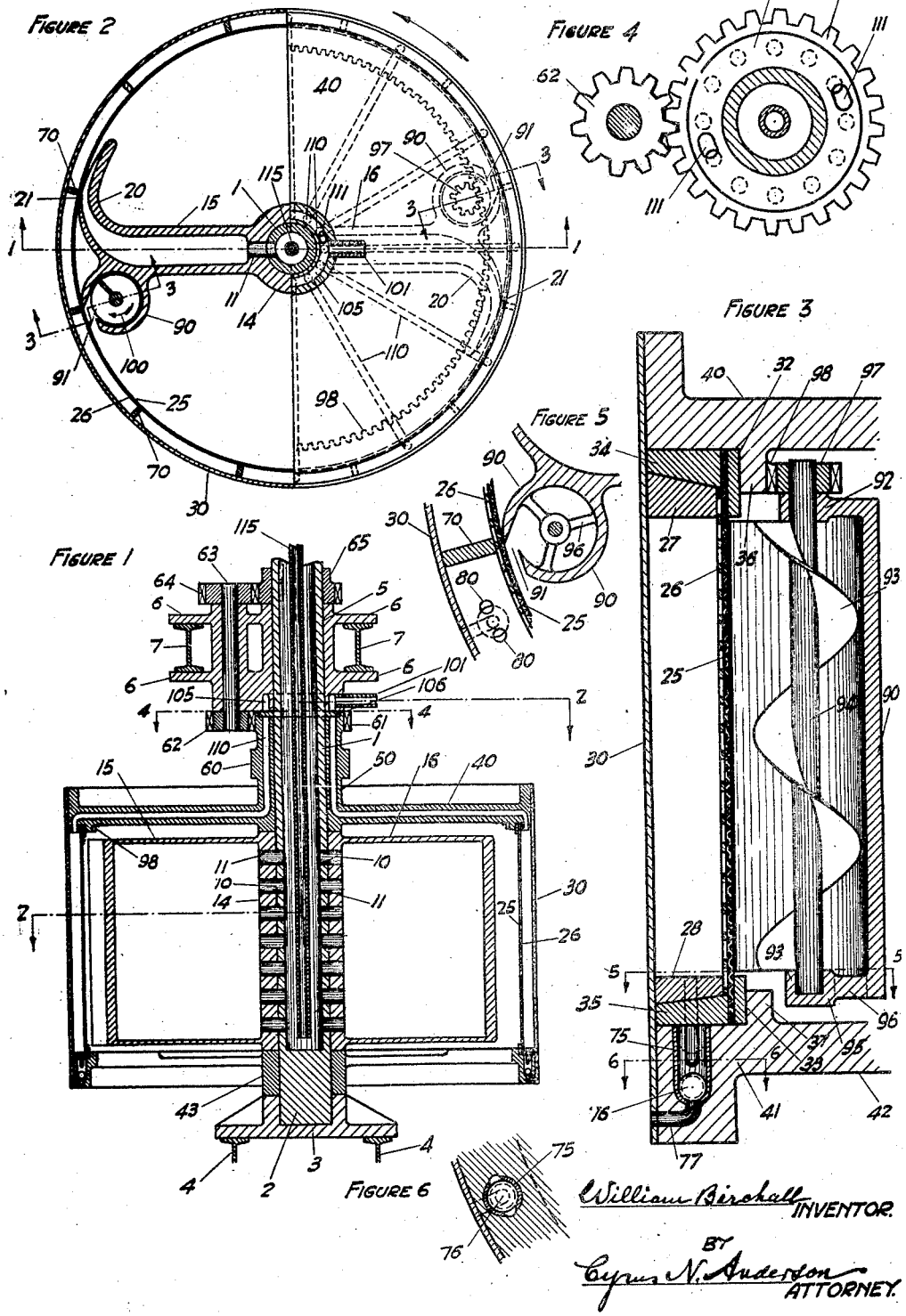

1,572,420

UNITED STATES PATENT OFFICE.

WILLIAM BIRCHALL, OF ASHBOURNE, PENNSYLVANIA.

CENTRIFUGAL SEPARATOR.

Application filed May 10, 1921. Serial No. 468,443.

*To all whom it may concern:*

Be it known that I, WILLIAM BIRCHALL, a citizen of the United States, and a resident of Ashbourne, in the county of Montgomery and State of Pennsylvania, have invented an Improvement in Centrifugal Separators, of which the following is a specification.

My invention relates to centrifugal separators adapted for the separation of mixtures of solids and liquids, and comprises certain improvements which have been embodied in the construction disclosed in my co-pending application filed April 1, 1921, Serial Number 457,652, and it has for one of its objects broadly to provide means whereby the pores or interstices in the porous lining in the separator shell or outer wall structure shall be maintained in free and open condition to thereby insure that the separator shall function efficiently at all times.

Other and more specific objects of the invention are to provide means for causing air or other suitable fluid to flow through the said pores or interstices inwardly or in a direction in opposition to the centrifugal force of the separator; to provide means for properly timing the delivery of the air or other suitable fluid into chambers between inner and outer wall portions of the cylindrical wall structure of the said separator; to provide an efficient means for removing from the inside surface of the cylindrical wall structure of the separator the material deposited thereon and conveying the same therefrom; and also to provide means for preventing the clogging of certain portions of the passageways employed for distributing the mixture of solids and liquids to be separated.

Other objects and advantages of my invention will be pointed out in the detailed description thereof which follows or will be apparent from such description.

In order that the invention may be more readily understood, reference may be had to the accompanying drawing in which I have illustrated one convenient embodiment thereof. However, it will be understood that the said invention is susceptible of embodiment in other forms of construction than that shown and that changes in the details of construction within the scope of the claims may be made without departing from the said invention.

In the drawing:

Figure 1 is a vertical sectional view of a centrifugal separator embodying my invention taken along the line 1—1 of Figure 2;

Figure 2 is a view taken along the line 2—2 of Figure 1;

Figure 3 is a vertical sectional view taken along the lines 3—3 of Figure 2;

Figure 4 is a transverse sectional view taken along the line 4—4 of Figure 1;

Figure 5 is a transverse sectional view of a portion of the separator taken along the line 5—5 of Figure 3; and Figure 6 is a transverse sectional view of a portion of the separator taken along the line 6—6 of Figure 3.

Referring to the drawing: 1 designates a centrally situated hollow shaft terminating at its lower end in a solid portion 2 supported in a stationary bearing 3, which in turn is supported upon sills, portions only of which are shown at 4. The upper portion of the shaft extends through and is supported in a bearing structure 5 having parallel oppositely extending projections 6 by means of which it is supported on the I-beams or sills 7.

The mixtures of solids and liquids to be separated are delivered from any suitable source of supply, as for instance a reservoir (not shown), into the upper end portion of the hollow shaft, the said upper end portion being broken away so that it is not shown, and flow downward into the lower portion of the shaft, from which they are discharged through openings 10 in the shaft and through openings 11 in a cylindrical hub portion 14 surrounding the said shaft into the passageways of the radially extending arms 15 and 16 which are integral with the cylindrical hub portion 14. These distributing arms 15 and 16, in the construction shown, extend diametrically of the cylindrical separator and in opposite directions from each other. It will be understood that the number of distributing arms may be increased if desired, also that only one distributing arm may be employed.

The outer end portions of the distributing arms are curved and extended rearwardly, as indicated at 20, and the forward or front wall thereof is terminated, as indicated at 21, a distance in front of the end of the opposing side of the said arm. The portions of the rear sides of the said arms which project beyond the ends at 21 of the opposite sides thereof are substantially concentric with the axis of the shaft 1 and parallel with the adjacent opposing inside surface of the cylindrical wall structure of the separator.

The wall structure comprises the inner sheet or layer of fabric or other suitable porous material 25 which rests against a perforated or foraminous sheet 26 which is secured in any suitable manner at its upper and lower ends, preferably by welding, to the top and bottom frame members 27 and 28. The outer edges of these members 27 and 28 are secured to the outer cylindrical solid wall 30 of sheet metal in any suitable manner, also preferably by welding. The upper and lower end portions of the porous sheet or layer 25 are clamped between clamping bands 32 and 33 and the inner edges of the members 34 and 35. The lower side of the member 34 is inclined upwardly and outwardly and co-operates with the inwardly and downwardly inclined upper surface of the member 27 while the upper side of the lower member 35 is inclined outwardly and downwardly and co-operates with the inwardly and upwardly inclined bottom surface of the member 28. The said members 34 and 35 are detachably secured in any suitable manner, as by screws, to the cylindrical outer wall member 30 of the wall structure. The inner surfaces of the clamping bands 32 and 33 are seated against shoulders formed by downwardly and upwardly extending projections 36 and 37, the former being formed upon a top cover member 40 of the separator, while the latter is formed upon an outer rim portion 41 carried by spiders or arms 42 which project radially from a hub portion 43 surrounding the solid portion 2 of the shaft 1 and being supported upon the upper edge of the bearing 3 of the said shaft.

While the top cover member 40 is shown in the form of a continuous plate-like structure, it is to be understood that the said member may consist of an outer annular rim portion connected to and supported upon the hub 50 mounted upon the shaft 1 and contacting at its lower end with the upper end of the cylinder 14. The upper end portion of the solid cylindrical wall 30 is secured to the peripheral surface of the member 40 while the lower end thereof is secured to the peripheral surface of the annular rim portion 41 carried upon the spiders 42.

Although the outer and inner cylindrical portions of the wall structure, constituting the separating medium of the separator, are shown as being continuous, it will be understood that the said wall structure may be divided into sections as shown in my copending application aforesaid. Rotation of the shaft 1 and of the top member 40 and the lower member comprising the parts 41 and 42 and upon which the outer wall structure of the apparatus is supported is effected in the following manner: The hub 50 is extended or elongated and is provided with a pulley portion or section 60 which is adapted to receive a driving band driven from a source of power, neither the band nor the source of power being shown. The wall structure of the apparatus, being connected with the outer peripheral edge of the member 40, is rotated with the driving pulley 60 which is, in the construction shown, integral with the hub 50 with which the part 40 is integrally connected. At its upper end portion the hub 50 is provided with a gear 61 which meshes with a pinion 62 secured to the lower end of a shaft 63 supported in a bearing upon the bearing structure 5 previously referred to. The upper end of the shaft 63 is provided with a pinion 64 which is larger than the pinion 62, which pinion is in engagement with a gear 65 which is secured to the hollow shaft 1. It is apparent, therefore, that the shaft 1 is driven by the power applied to the pulley 60 and also that it is driven or rotated in the same direction as the pulley 60 and the portion of the structure connected thereto. It is also apparent that the relation of the intermediate driving gears to each other is such that the said shaft and the distributing arms carried thereby are rotated at greater speed than the surrounding cylindrical wall structure of the said apparatus.

In the operation of the device a mixture of solid and liquid materials is delivered to the hollow shaft 1 and is delivered against the inside surface of the porous sheet or layer 25 The solid portion of the mixture thus delivered against the said porous layer or sheet is retained thereon, as described in detail in my application aforesaid, while the liquid content of the mixture escapes through the said layer and is caught or lodged in the compartments formed between the inner wall section comprising the parts 25 and 26 and the outer solid wall 30 by means of the up-right or vertical strips 70, the opposite edges of which are secured, preferably by welding, to the inner and outer surfaces respectively of the metal sheets 30 and 26. In a manner which will be hereinafter fully described, air or other suitable fluid under pressure is delivered also to these compartments and flows inwardly through the porous sheet or layer 25 for the purpose previously stated herein. In order that the liquid which collects in these compartments may be discharged therefrom without permitting the outflow of the air or other fluid therefrom through the passageways provided for the discharge of the liquid, I have provided the said liquid discharge passageways comprising a relatively large intermediate portion 75 the bottom of which forms a valve seat for the reception of a ball float valve 76 which closes the inner or upper end of the smaller portion 77 of the said discharge opening. For the purpose of delivering the liquid from the respective compartments I have provided two small holes 80 which are spaced from each other and which extend through the parts 28 and 35 and are joined at their lower ends to opposite side portions of the intermediate relatively large portion of the liquid discharge passageway. The lower portions of the holes 80 are situated in such relation to the relatively large portion 75 of the passageway that they form grooves or passageways upon opposite sides thereof to permit the flow of water downwardly through the said passageway when the float valves 76 are lifted or raised by the presence of liquid in the relatively large portion 75 of the passageways. When the portions 75 of the passageways contain liquid the flow of air or other suitable gaseous fluid therethrough is prevented and when the liquid has escaped from the said passageways so as to permit the seating of the float valves 76 in the position as shown in Figure 3 of the drawing the outflow of air through the liquid discharge passageways is prevented by the said valves.

For the purpose of removing from the inner surface of the porous layer or sheet 25 the solid component of the mixture which is retained thereon I have provided cylindrical members 90, one of which is supported upon the outer forward end portion of each of the distributing arms 15 and 16. The said cylinders are slotted, as indicated at 91, and the forward edges of the rear side of the said slots are situated practically in contact with the inner surface of the said porous sheet or layer 25 so that as the said cylindrical members travel forwardly in relation to the cylindrical wall structure of the separator the said solid component is scraped from the surface of the sheet 25, which constitutes the inner sheet or layer of the separating wall structure. By reason of the forward rotary movement of the said cylindrical members, the solid material thus removed passes through the said slots into the interior of the cylinders 90 and is conveyed downwardly therein by the spiral conveyors 93 which are situated within the said cylindrical members and are supported upon the revoluble shafts 94 which in turn are supported at their lower ends in bearings 95 integral with the inner ends of the bars 96 which extend inwardly from the lower end portions of the said cylinders, as best shown in Figures 3 and 5. The upper end portions of the revoluble shafts 94 are supported in bearings 92 which are integrally connected to the upper end portions of the cylinders 90. A pinion 97 is secured to each of the shafts 94 above the bearings 92 which pinion is in engagement with an internal spur gear 98 upon the inner side of the projection 36. In view of the fact that the distributing arms 15 and 16 are rotating in the same direction as but at a greater speed than the gear 98, it will be apparent that the shafts 94 and the spiral conveyers 93 carried thereby rotate in a clockwise direction opposite that of the direction in which the distributing arms 15 and 16 and the separating wall structure rotate, as indicated by the arrow 100 in Figure 2 of the drawing.

In the employment of the machine it is necessary, at least in the cases of some mixtures of solids and liquids, that means be provided to keep the pores or interstices of the porous sheet or layer 25 free in order that the separation of the solid and liquid components may be properly and efficiently effected. For this purpose I have provided means for supplying air under pressure successively to the compartments formed by the vertical strips 70 intermediate the inner and outer walls of the wall structure. The means employed by me for this purpose comprises an annular chamber 105 at the lower end of the bearing structure 5, the lower side of which chamber is closed by means of the annular flange-like member 106 which is secured, preferably adjustably, to the shaft 1 and is adapted to rotate therewith. The said annular flange member 106 is seated in an annular depression formed in the upper end of the hub 50 into which the upper ends of the passageways 110 open. These passageways extend downwardly through the hub 50 parallel with the shaft 1 and then outwardly through the member 40, radiating from the axis of the shaft 1 as a center, as is apparent from Figures 2 and 4. The outer ends of the said passageways 110 open into the upper ends of the compartments formed by the vertical strips 70 between the inner and outer walls of the cylindrical wall structure of the separator. There should be at least as many of these passageways 110 as there are compartments formed by said vertical strips 70. The annular flange 106 is provided with two diametrically opposed oval openings 111 through which openings air under pressure which has been delivered to the annular chamber 105 from a pipe 101 is adapted to be discharged successively into the upper ends of the passageways 110. These holes are so arranged with respect to the distributing arms 15 and 16 that the air is delivered successively into the passageways which open at their outer ends into compartments formed by the vertical strips 70 which occupy positions immediately in front or in advance of the said distributing arms. For instance, it will be observed by reference to Figure 2 that the forward end of the opening 111 shown therein is extended a slight distance over the upper end of the passageway 110. The air under pressure, therefore, is delivered into the compartment which occupies a position immediately in front and adjacent to the cylindrical member 90 upon the arm 16. Upon the further rotation of the two rotating members the said oval opening 111, which is shown in Figure 2, moves forwardly with respect to the member 40 and the parts secured to and rotating therewith so that the said opening 111 next passes over the upper end of the succeeding passageway 110, and so on over and over during the operation of the machine.

The air or other suitable gaseous fluid which is delivered into the compartments formed by the vertical strips 70 between the outer and inner walls of the wall structure flows inwardly through the pores of the porous inner sheet or layer of the wall structure, so that the said pores are prevented from being clogged or closed. By this means the apparatus is maintained in condition to perform satisfactory and efficient work.

As already pointed out, the air or other gaseous fluid is prevented from passing outwardly through the passageways leading from the bottoms of the compartments formed by the vertical strips 70 either by the presence of liquid in the said passageways or by the ball valves 76 in the larger portion or section thereof.

In the continued use or operation of the apparatus it may happen that the material being treated will settle in the lower portion of the hollow shaft 1 and also that the openings or perforations leading from the said shaft therethrough and through the cylindrical hub 14 would become clogged. In order to relieve or remove such clogged condition I have provided a pipe 115 which projects downward into the hollow shaft 1 and terminates near the lower end thereof through which air or steam is adapted to be blown and forced into the said shaft to effect the agitation and breaking up of any deposit which may be formed therein or within the passageways 10 and 11 or within the passageways through the distributing arms 15 and 16, so as to permit free passage of the mixtures of solids and liquids through the said shaft and the passageways through the said arms to the outer ends of the latter where the said mixture is thrown against the inner surface of the porous sheet or layer 25. As already stated, the solid component of the mixture is retained upon the inner surface of the said sheet while the liquid content thereof, under the influence of centrifugal force, passes through the pores thereof and is delivered into the compartments formed by the vertical strips 70 situated at intervals in the space between the inner and outer wall members of the cylindrical wall structure.

Having thus described my invention, what I claim and desire to secure by Letters Patent is:

1. In a centrifugal separator adapted for separating mixtures of solids and liquids, the combination of rotating separating means, radial means for delivering a mixture of solids and liquids on to the inner surface of said separating means, said radial means being rotatable the liquid content thereof escaping and leaving the solid content of the mixture on said surface, means located eccentrically of the axis of rotation of said radial means for removing the said solid content from said surface which means is carried by said radial means, and means for conveying the same away from its point of removal and effecting its discharge from said separator.

2. In a centrifugal separator adapted for separating mixtures of solids and liquids, the combination of rotating separating means, rotatable means for delivering a mixture of solids and liquids onto the inner surface of said separating means, the liquid thereof escaping and leaving the solid content of the mixture on said surface, a cylinder mounted on the rotatable delivering means a distance from the center of rotation of said means and in adjacent relation to the inner surface of the said separating means, said cylinder being provided with a slot, one edge of which constitutes a scraper for removing the said solid content from the said surface and a conveyer mounted within the said cylinder for conveying the solid content from its point of removal and effecting its discharge from the said separator, the said conveyer being rotatable about its own axis.

3. In a centrifugal separator adapted for separating mixtures of solids and liquids, the combination of rotating separating means, means for delivering a mixture of solids and liquids onto the inner surface of said separating means, the liquid thereof escaping and leaving the solid content of the mixture on said surface, a scraper for removing the said solid content from the said surface, a spiral conveyer for conveying the said solid content from its point of removal and effecting its discharge from said separator, and means for causing rotation of said conveyer in a direction opposite the movement of the said scraper.

4. In a centrifugal separator adapted for separating mixtures of solids and liquids, the combination of rotating cylindrical means for separating mixtures of solids and liquids, rotating distributing means for supplying the said mixtures onto the inner surface of the said separating means, means for rotating the said distributing means in the same direction as but at a greater speed than that of the revolution of the said separating means, a scraper carried by the said distributing means for removing the solid content of the said mixture from the inside surface of the said separating means, the said scraper being situated in front of the said distributing means by which it is carried, and means situated adjacent to the said scraper for conveying the said solid content of the mixture away from its point of removal and effecting its discharge from said separator.

5. In a centrifugal separator adapted for separating mixtures of solids and liquids, the combination of rotating cylindrical means for separating mixtures of solids and liquids, rotating distributing means for supplying the said mixtures onto the inner surface of the said separating means, means for rotating the said distributing means in the same direction as but at a greater speed than that of the revolution of the said separating means, a scraper carried by the said distributing means for removing the solid content of the said mixture from the inside surface of the said separating means, the said scraper being situated in front of the said distributing means by which it is carried, a rotatable conveying means situated adjacent the said scraper for receiving and conveying the said solid content away from its point of removal and effecting its discharge from the said separator, and means for causing rotation of said conveyer in a direction opposite that of the direction of rotation of the said distributing means and the said separating means.

6. In a centrifugal separator adapted for separating mixtures of solids and liquids, the combination of cylindrical separating means, means for causing rotation of said separating means, a distributing arm for delivering mixtures of solids and liquids onto the inner surface of said separating means, the liquid thereafter escaping and leaving the solid content of the mixtures on said surface, means for causing rotation of the said distributing arm in the same direction as but at a greater speed than that of the rotation of said separating means, means carried by the said distributing arm adjacent its outer end and adapted to remove the solid contents of the said mixtures from the inside surface of the said separating means, and means situated adjacent the said removing means and traveling in unison therewith for conveying the material removed thereby from the said separator.

7. In a centrifugal separator adapted for separating mixtures of solids and liquids, the combination of cylindrical separating means, means for causing rotation of said separating means, a distributing arm for delivering mixtures of solids and liquids onto the inner surface of said separating means, the liquid thereafter escaping and leaving the solid content of the mixtures on said surface, means for causing rotation of the said distributing arm in the same direction as but at a greater speed than that of the rotation of said separating means, means carried by the said distributing arm adjacent its outer end and adapted to remove the solid contents of the said mixtures from the inside surface of the said separating means, a rotatable spiral conveyer supported in adjacent relation to the said removing means and traveling in unison therewith, means for causing the said solid contents to be delivered to the said conveyer as they are removed from the said separating means, and means for causing rotation of the said spiral conveyer in a direction the reverse of the bodily traveling movement thereof to effect discharge of the said solid contents from the said separator.

8. In a centrifugal separator adapted for separating mixtures of solids and liquids, the combination of separating means comprising a filtering member through which the liquid content of the mixture is adapted to pass, due to the action of centrifugal force, and upon the inner surface of which the solid content of said mixture is adapted to be retained, means for removing the said solid content from the inner surface of said filtering member, and pneumatic means for supplying a gaseous fluid under pressure successively to the exterior sides of portions of the said filtering member in front of the said last mentioned means for maintaining the pores of said filtering member open.

9. In a centrifugal separator adapted for separating mixtures of solids and liquids, the combination of a rotatable separating means comprising an inner perforated wall and an outer imperforate wall situated in spaced relation with respect to each other, means for closing the upper and lower ends of said space, means for dividing the said space into compartments, means for delivering a mixture of solids and liquids to the inner surface of the perforated wall, the solid content of the said mixture being deposited upon the inner surface of said wall, means which is movable relatively to the said perforated wall for removing the solid content from the inner surface thereof and means for supplying a gaseous fluid under pressure successively to the said compartments as they occupy positions in front of the said means for removing the solid content from the inner surface of said perforated wall for maintaining the pores of the said perforated wall in open condition.

10. In a centrifugal separator adapted for separating mixtures of solids and liquids, the combination of a rotatable separating means comprising an inner perforated wall and an outer imperforate wall, which walls are situated in spaced relation with respect to each other, means for dividing the space between the said walls into a plurality of closed compartments, centrifugally acting means for supply mixtures of solids and liquids to the inner surface of the inner perforated wall, means carried by the said centrifugally acting means for removing the solid content of the said mixture from the inner surface of the said inner perforated wall, and means for supplying a gaseous fluid under pressure successively to the said compartments as they reach positions in front of the said means for supplying the said mixtures to the said separating means, the pressure of the said gaseous fluid within the said compartments causing the same to flow inwardly through the perforations of the said inner wall to maintain the said perforations in open condition.

11. In a centrifugal separator adapted for separating mixtures of solids and liquids, the combination of cylindrical rotating separating means comprising inner and outer walls supported in spaced relation with respect to each other and the inner walls comprising a sheet of porous material, means for depositing the mixtures of solids and liquids to be separated upon the inner surface of the said rotating separating means, the liquid content thereafter escaping through the said porous sheet leaving the solid content upon the inner surface of the said sheet, and means for supplying a gaseous fluid under pressure to the space intermediate the said inner and outer walls and forcing the same inwardly through the pores of the said porous sheet in opposition to centrifugal force to maintain the said pores free of solid material.

12. In a centrifugal separator adapted for separating mixtures of solids and liquids, the combination of a rotating cylindrical separating means comprising inner and outer walls supported in spaced relation with respect to each other, means for separating said space into a plurality of closed compartments, rotating distributing means for delivering mixtures of solids and liquids to the inner surface of the inner wall, the said distributing means rotating in the same direction as and at a greater speed than the separating means, and means for supplying a gaseous fluid under pressure to the said compartments successively, the gaseous fluid being supplied successively immediately in advance of the said distributing means.

13. In a centrifugal separator adapted for separating mixtures of solids and liquids, the combination of a rotatable cylindrical separating means comprising inner and outer walls supported in spaced relation with respect to each other, the inner wall comprising a layer of porous material, means for closing the upper and lower ends of the space between said walls, means for dividing the said space into a plurality of compartments, distributing means for delivering mixtures of solids and liquids to the inner surface of the inner wall, means for causing simultaneous rotation of the separating and distributing means, the latter being rotated in the same direction as but at a greater speed than that of the rotation of the separating means, and means for supplying a gaseous fluid under pressure successively to the said compartments, substantially as described.

14. In a centrifugal separator adapted for separating mixtures of solids and liquids, the combination of a rotatable cylindrical separating means comprising inner and outer walls supported in spaced relation with respect to each other, the inner wall comprising a layer of porous material, means for closing the upper and lower ends of the space between said walls, means for dividing the said space into a plurality of compartments, distributing means for delivering mixtures of solids and liquids to the inner surface of the inner wall, means for causing simultaneous rotation of the separating and distributing means, the latter being rotated in the same direction as but at a greater speed than that of the rotation of the separating means, and means for supplying a gaseous fluid successively to the said compartments under pressure sufficient to cause the same to flow inwardly through the pores of the said porous layer in opposition to the centrifugal force developed by the rotation of the said separating means.

15. In a centrifugal separator adapted for separating mixtures of solids and liquids, the combination of a rotatable cylindrical separating means comprising inner and outer walls supported in spaced relation with respect to each other, the inner wall comprising a layer of porous material, means for closing the upper and lower ends of the space between said walls, means for dividing the said space into a plurality of compartments, distributing means for delivering mixtures of solids and liquids to the inner surface of the inner wall, means for causing simultaneous rotation of the separating and distributing means, the latter being rotated in the same direction as but at a greater speed than that of the rotation of the separating means, and means for delivering a gaseous fluid to the said compartments successively, the delivery being made to that compartment immediately preceding the distributing means and the pressure of the gaseous fluid within the said compartment being sufficient to cause the same to flow inwardly therefrom through the pores of the said porous layer.

16. In a centrifugal separator adapted for separating mixtures of solids and liquids, the combination of rotating separating means comprising inner and outer walls supported in spaced relation to each other, the inner wall including a layer of porous material, means for dividing the space between the said walls into a plurality of closed compartments, a chamber containing a gaseous fluid under pressure, a plurality of passageways terminating at their inner ends in operative relation to the said chamber and at their outer ends in the said compartments, and means for successively placing the inner ends of the said passageways in communication with the said chamber whereby a gaseous fluid under pressure may be delivered to successive compartments.

17. In a centrifugal separator adapted for separating mixtures of solids and liquids, the combination of a rotating separating means comprising inner and outer walls supported in spaced relation to each other and the inner wall including a porous sheet, means for dividing the space between the said walls into a plurality of closed compartments, rotating means for supporting said separating means, said supporting rotating means having passageways extending radially therein from the central portion of the said separator and terminating at their outer ends in the said compartments, a stationary chamber containing a gaseous fluid under pressure, and rotating means intermediate the said chamber and the inner ends of the said passageways for successively placing the said inner ends in communication with the said chamber whereby a gaseous fluid contained therein under pressure is distributed through the said successive passageways into successive compartments.

18. In a centrifugal separator adapted for separating mixtures of solids and liquids, the combination of a cylindrical separating means comprising inner and outer walls supported in spaced relation to each other, the inner wall including a sheet of porous material, means for closing the upper and lower ends of the space between said walls, means for permitting liquids to escape from said space but preventing the escape of a gaseous fluid therefrom, means for causing rotation of said separating means, and means for supplying a gaseous fluid to said space under pressure sufficient to cause flow of the same inwardly through the pores of said porous sheet in opposition to the centrifugal force generated by the rotation of said separating means.

19. In a centrifugal separator adapted for separating mixtures of solids and liquids, the combination of a cylindrical separating means comprising inner and outer walls supported in spaced relation to each other, the inner wall including a sheet of porous material, means for dividing the said space into a plurality of closed compartments, the said compartments having passageways leading therefrom, means for permitting the passage of liquids through said passageways but preventing the passage of a gaseous fluid therethrough, means for causing rotation of said separating means, rotating means for delivering mixtures of solids and liquids to the inner surface of the said separating means, the liquid content thereafter escaping into said compartments leaving the solid content upon the said surface, and means for supplying gaseous fluids to said compartments under presure sufficient to cause the same to flow therefrom inwardly through the pores of said sheet of porous material.

20. In a centrifugal separator adapted for separating mixtures of solids and liquids, the combination of a rotatable hollow shaft, a rotatable hollow separating means, one or more arms secured to said shaft and rotating therewith and terminating adjacent the inner surface of said separating means, the said arm or arms having a passageway or passageways for distributing the said mixtures to said separating means, and the said shaft having passageways communicating with the passageway or passageways in said arm or arms, and the said shaft being adapted to receive the said mixtures and to deliver the same through said passageways, and means for delivering a gaseous fluid under pressure into said shaft for preventing the said passageways from becoming clogged up and interrupted.

In testimony that I claim the foregoing as my invention, I have hereunto signed my name this 21st day of April, A. D., 1921.

WILLIAM BIRCHALL.